(12) United States Patent
McKee

(10) Patent No.: US 10,442,535 B2
(45) Date of Patent: Oct. 15, 2019

(54) AIRCRAFT MONUMENT

(71) Applicant: B/E Aerospace, Inc., Wellington, FL (US)

(72) Inventor: Jefferey McKee, Duvall, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 281 days.

(21) Appl. No.: 15/477,556

(22) Filed: Apr. 3, 2017

(65) Prior Publication Data

US 2017/0283059 A1   Oct. 5, 2017

Related U.S. Application Data

(60) Provisional application No. 62/317,913, filed on Apr. 4, 2016, provisional application No. 62/317,705, filed on Apr. 4, 2016, provisional application No. 62/317,788, filed on Apr. 4, 2016, provisional application No. 62/317,787, filed on Apr. 4, 2016.

(51) Int. Cl.
*B64D 11/00* (2006.01)
*B64D 11/06* (2006.01)
*B64D 11/04* (2006.01)

(52) U.S. Cl.
CPC ........ *B64D 11/003* (2013.01); *B64D 11/0007* (2013.01); *B64D 11/04* (2013.01); *B64D 11/0626* (2014.12); *B64D 2011/0046* (2013.01)

(58) Field of Classification Search
CPC combination set(s) only.
See application file for complete search history.

(56) References Cited

U.S. PATENT DOCUMENTS

| | | | |
|---|---|---|---|
| 2011/0101160 A1* | 5/2011 | Gomes | B64C 1/1423 244/118.5 |
| 2013/0149950 A1* | 6/2013 | Umlauft | B64D 13/00 454/76 |
| 2013/0240669 A1* | 9/2013 | Wilkinson | B64D 11/00 244/118.5 |
| 2013/0248649 A1* | 9/2013 | Burd | B64D 11/04 244/1 N |
| 2013/0334369 A1* | 12/2013 | Schliwa | B64D 11/02 244/118.5 |
| 2014/0048650 A1* | 2/2014 | Schliwa | B64D 11/00 244/118.5 |

(Continued)

FOREIGN PATENT DOCUMENTS

| | | | |
|---|---|---|---|
| WO | 2016/016027 A1 | 2/2016 | |
| WO | WO2016016027 | * 2/2016 | B64D 11/06 |

OTHER PUBLICATIONS

PCT Search Report and Written Opinion issued in related application PCT/US2017/025781, dated Jun. 21, 2017, 9 pages.

*Primary Examiner* — Assres H Woldemaryam
(74) *Attorney, Agent, or Firm* — Clements Bernard Walker PLLC

(57) ABSTRACT

In a preferred embodiment, an aircraft monument is adapted for being mounted against an aft-facing bulkhead of the aircraft. The monument may have an aisle-accessible compartment that includes comestible item dispensers and lower footwell regions to accommodate the passengers seated immediately aft of the monument. The monument may also include an aft-facing wall that is readily removal during a maintenance operation so as to facilitate servicing of a heater or chiller unit disposed inside the monument.

20 Claims, 12 Drawing Sheets

(56) References Cited

U.S. PATENT DOCUMENTS

| | | | | |
|---|---|---|---|---|
| 2014/0217239 A1* | 8/2014 | Ehlers | ................... | B64D 11/02 |
| | | | | 244/118.5 |
| 2014/0224930 A1* | 8/2014 | Ivester | ................... | B64D 11/04 |
| | | | | 244/118.5 |
| 2015/0284085 A1* | 10/2015 | McKee | ................. | B64D 11/02 |
| | | | | 244/118.5 |
| 2016/0009395 A1* | 1/2016 | Savian | .................. | B64D 11/02 |
| | | | | 244/118.5 |
| 2016/0084592 A1* | 3/2016 | Mackin | ................. | B64D 11/04 |
| | | | | 165/287 |
| 2016/0338488 A1* | 11/2016 | Garcia | .............. | B64D 11/0007 |
| 2017/0021929 A1* | 1/2017 | McKee | ............. | B64D 11/0691 |
| 2017/0297717 A1* | 10/2017 | Moran | ................ | B64D 11/003 |

* cited by examiner

AIRCRAFT MONUMENT

RELATED APPLICATIONS

This application claims priority to the following: U.S. Provisional Patent Application Ser. No. 62/317,913, entitled "Modular Monument for Aircraft Cabins," filed Apr. 4, 2016; U.S. Provisional Patent Application Ser. No. 62/317,705 entitled "Self-Serve Chilled Food and Beverage Unit for Passenger Aircraft," filed Apr. 4, 2016; U.S. Provisional Patent Application Ser. No. 62/317,788 entitled "Stowage Closet with Passenger Stowage Cavity and Foot Rest," filed Apr. 4, 2016; and U.S. Provisional Patent Application Ser. No. 62/317,787 entitled "Front Row Footwell for Economy Class Passengers," filed Apr. 4, 2016, each of which is hereby incorporated by reference in its entirety.

This application incorporates by reference, in their entirety, the following patent applications by B/E Aerospace directed to aircraft monuments: U.S. patent application Ser. No. 15/098,890, entitled "Modular Aircraft Closet," filed Apr. 14, 2016, and U.S. patent application Ser. No. U.S. Ser. No. 15/288,823, entitled "Aircraft Modular Lavatory System" filed Oct. 7, 2016.

BACKGROUND

Modern passenger aircraft are equipped with a number of features to increase passenger comfort and make flights more pleasant and enjoyable for passengers. Such features include maximizing the space available for passengers and providing various in-flight amenities for passengers. Although first class passengers generally enjoy more amenities than coach or business class passengers, airlines still want non-first class passengers to have an enjoyable flight experience.

Various aircraft features can provide a variety of services to the passengers aboard the aircraft. For example, food and beverage services are frequently provided to passengers using a meal cart controlled by an onboard flight attendants. Different types of aircraft monuments can be installed at various locations within the aircraft to increase passenger comfort and safety. For example, seat ottomans may be used for increased passenger comfort, closets may be used to increase storage capacity for passenger items, and bar units may be used to provide drinks, snacks and other amenities to passengers.

SUMMARY OF ILLUSTRATIVE EMBODIMENTS

In a preferred embodiment, an aircraft monument is adapted for being mounted against an aft-facing bulkhead of the aircraft. The monument may have an aisle-accessible compartment that includes comestible item dispensers and lower footwell regions to accommodate the passengers seated immediately aft of the monument. The monument may also include an aft-facing wall that is readily removal during a maintenance operation so as to facilitate servicing of a heater or chiller unit disposed inside the monument.

Apparatus and associated methods relate to an aircraft cabin monument with integrated footwell adapted for use by passengers seated facing the monument. In an illustrative example, the monument may have at least one footwell disposed in the bottom portion of the monument. The footwell may be configured to receive, for example, a passenger's feet and lower legs. The monument may have at least one side wall configured to be adjacent to an aisle of an aircraft. In an exemplary embodiment, at least one monument compartment may be contained within the monument housing, which may retain and dispense items accessible, for example, by passengers on-demand. The footwell may include amenities, for example, air circulation at user-selected flow rates and/or temperature. In various embodiments, the monument with the integrated footwell may provide for increased passenger and cabin space by creating more foot and leg space for a passenger.

Various embodiments may achieve one or more advantages. For example, some embodiments may increase passenger comfort by providing a surface on which a passenger can rest their feet and lower legs. In some embodiments, the service requirements imposed on the flight attendant crew may be reduced by allowing the passengers to serve themselves from a self-service monument and not requiring continual restocking of inventory by the flight attendant crew. In various embodiments, an aisle door may allow for easy and convenient access to the food and/or beverage items contained within compartments in the monument without significantly interfering with other seated passengers in the surrounding area. In some embodiments, a monument may have a detachable façade which facilitates a customizable close-out for the monument. In this sense, the façade and corresponding substructure may allow for various components of the monument to be upgraded, replaced, reconfigured, refaced, modified, or otherwise altered without having to entirely remove the monument and replace it with a new one.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
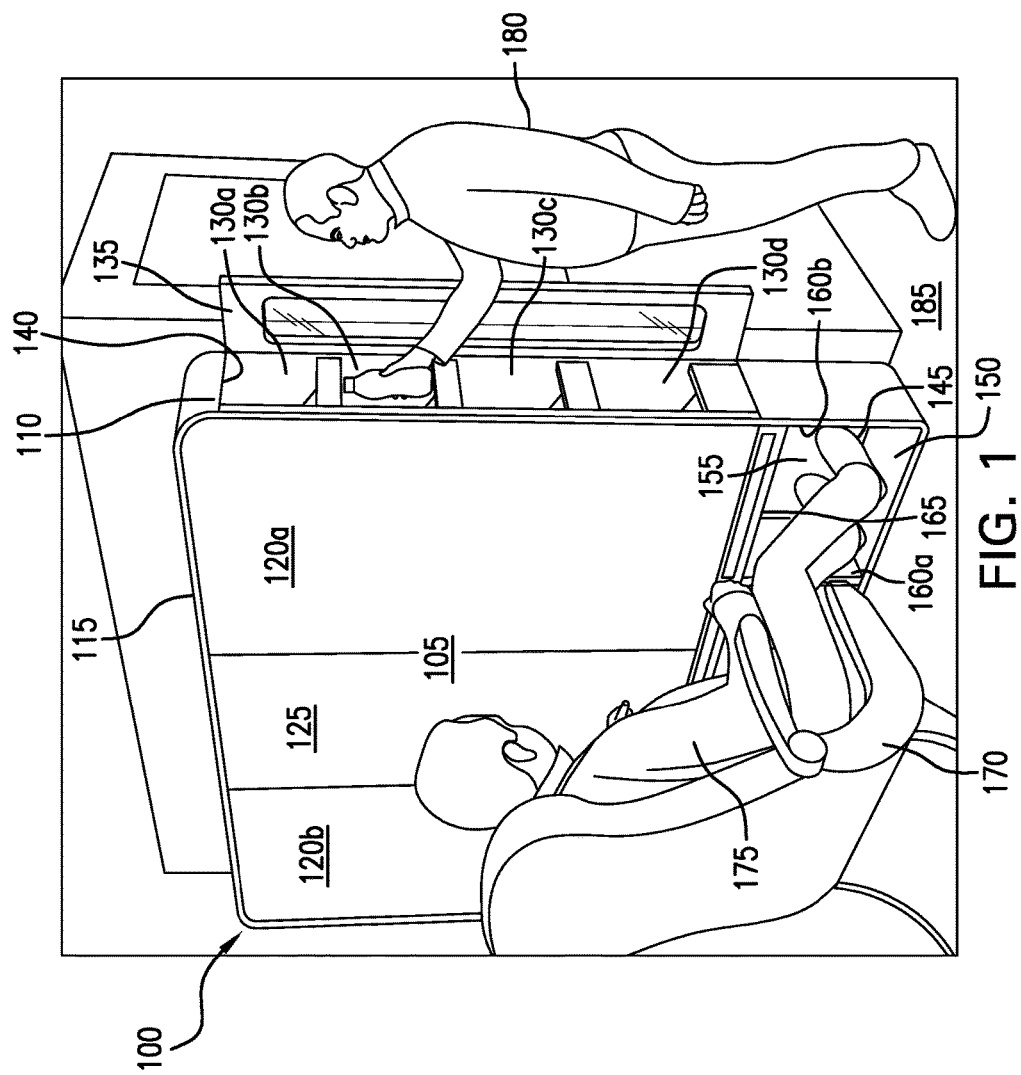
FIG. 1 depicts an exemplary centerline aircraft monument in use by passengers aboard a passenger aircraft.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 depicts an exemplary centerline aircraft monument in use by passengers aboard a passenger aircraft. In this particular embodiment, the monument 100 is located in front of the first row seating of a section of a cabin on the centerline of an airplane. The monument 100 forms all or part of a section divider or can be added on to an existing galley area. The monument 100 is defined by multiple walls (an aft-facing wall 105, an aisle-facing wall 110, and a forward-facing wall (not shown)) and a top cover 115. As shown in FIG. 1, the dimensionality of monument 100 is such that it is relatively narrow in a longitudinal direction and extends in a lateral direction across the width of the aircraft cabin. Thus, the monument 100 possesses a length substantially equal to one group of seats forming a portion of a row in an economy seating section. The monument 100 according to the embodiment shown sits on the deck of the aircraft cabin with an 11 in. (28 cm.) depth foot print. Of course, other dimensions can be used depending on the cabin size, seat spacing, and other considerations.

In the depicted embodiment, the monument 100 has side compartments 120a and 120b and a center compartment 125. The center compartment 125 is configured to supply heating and/or cooling to the side compartments 120a and 120b. Integrated into the aisle-facing wall 110 is an aisle door 135, which restricts and/or permits access to the inside of side compartment 120a. Access to the inside of side compartments 120b is accomplished by opening the aisle door 135 on the aisle-facing wall 110, which exposes the compartment bays 130a, 130b, 130c, and 130d. Compartment bays 130a, 130b, 130c, and 130d each have a light source 140 such that a user accessing side compartment 120a can see the contents contained within the compartment bays 130a, 130b, 130c, and 130d. Similarly, the opposite side compartment 120b also possesses an aisle-facing wall (not shown) with a door (not shown) that when opened, exposes compartment hays (not show) each with a light source (not shown).

Although shown as being positioned between the side compartments 120a and 120b, the center compartment 125 may instead be located elsewhere on the monument. For example, the center compartment 125 may instead be repositioned as a side compartment. Further, a portion of the contents of the center compartment 125 may be housed beneath a floor of the passenger cabin or above a ceiling of the passenger cabin. The center compartment may be separate from the monument 100 while still being operably connected to side compartments 120a and 120b. The center compartment 125 may also be positioned on the top or the bottom of the monument 100. Similarly, side compartments 120a and 120b may be located elsewhere on the monument.

The side compartments 120a and 120b may be used to store food and/or beverage items which can be accessed by passengers on-demand. For example, a thirsty passenger may use the aisle door 135 to access a cold beverage stored within the side compartments 120a and 120b whenever they so desire. The compartments 120a and 120b can be serviced and stocked by the ground catering crew to make the monument 100 self-sustaining by containing enough service items to last the entire flight duration. The service requirements imposed on the flight attendant crew are thus reduced by (1) allowing the passengers to serve themselves, and (2) not requiring continual restocking of inventory by the flight attendant crew. The aisle door 135 may allow for easy and convenient access to the food and/or beverage items contained within the side compartments 120a and 120b without significantly interfering with other seated passengers in the surrounding area.

Although shown as a swinging door, the aisle door may be any type of door. For example, the aisle door 135 may be a sliding door that can slide vertically or horizontally within a channel on the monument 100. The aisle door 135 may be a collapsible or foldable door that can be in a compact configuration when in an open position. In other embodiments, the aisle door 135 may be a shutter door that can retract into, or extend from a drum that supports the door.

In the bottom portion of monument 100 there is depicted at least one footwell 145. A typical footwell 145 is defined by a lower surface 150, a back wall 155, side walls 160a and 160b, and an upper surface 165. The monument 100 is positioned such that the footwell 145 can receive a passenger's feet while the passenger is sitting in a passenger seat 170. The footwell 145 provides for both creased passenger space (by creating more foot and leg space for the passenger) and increased passenger comfort (by providing a surface on which a passenger can rest their feet and lower legs). Other footwells (not shown) may also be located in front of each seat in a seating row, such that each passenger can use the footwell space for personal item storage or for resting the seated passenger's feet and lower legs.

Although the footwell 145 is depicted as having mostly flat surfaces which define a rectangular or trapezoidal prism, the footwell 145 may have other types of designs. For example, the surfaces of the footwell 145 may have a substantially curved shape, which may provide aesthetic or functional benefits to passengers. The footwell 145 may also have a grooved surface (or otherwise non-planar surface) that can provide a passenger's feet with additional frictional support.

In an illustrative example, a first passenger 175 is sitting in the passenger seat 170 with his or her feet and lower legs extending into of footwell 145. A second passenger 180 is illustrated as standing in an aisle 185 proximate to the aisle-facing wall 135. The second passenger 180 is shown as having opened the aisle door 135 to gain access the interior contents of side compartment 120b of the monument 100, thus allowing the second passenger to take chilled and/or heated items (such as a beverage or a snack) from the compartment bay 130a. This particular embodiment thus illustrates how the monument 100 provides self-service to passengers within an economy class environment with minimal or no additional workload being imposed on the flight crew.

Figure 2:
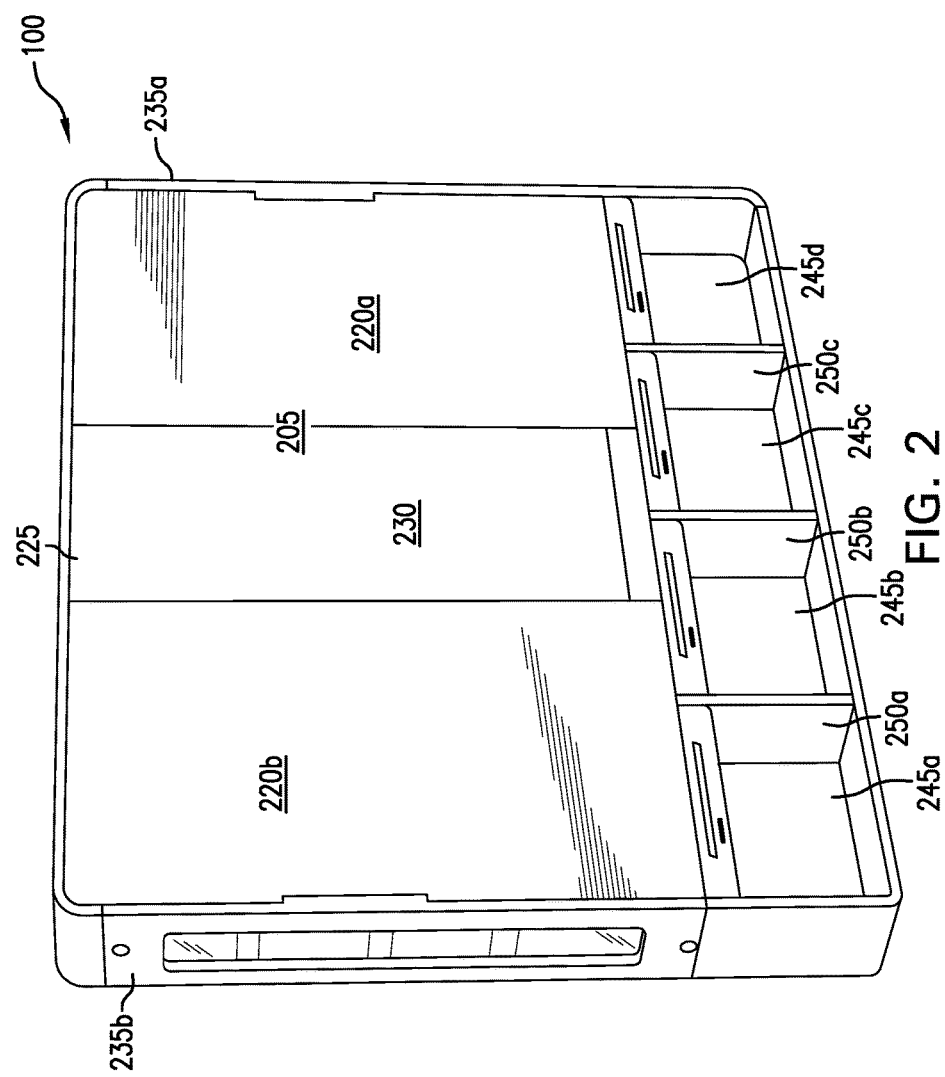
FIG. 2 depicts a perspective view of an exemplary aircraft monument with footwells built into the monument.

FIG. 2 depicts a perspective view of an exemplary aircraft monument with footwells built into the monument. The monument 100 houses side compartments 220a and 220b which are heated and/or cooled by the center compartment 225. The contents of center compartment 225 (which may include a thermal unit and electrical/ducting components) can be accessed by removing a center compartment panel 230.

The center compartment panel 230 and aft-facing wall 205 may be equipped with customizable LED back lit branding, and may be formed of a translucent material which provides a canvas for airlines to customize a unique branded look. The back lit branding may be powered by electrical wiring contained within the center compartment 225, or may receive power from a source external to the monument 100. Both the center compartment panel 230 and aft-facing wall 205 may be removed to permit customization of the branding displayed on their respective aft-facing surfaces.

On the lateral sides of the monument 100 are aisle doors 235a and 235b that restrict and permit access to the side compartments 220a and 220b, respectively. The aisle doors 235a and 235b are shown as being at least partially formed out of a transparent material, such that some of the interior space of the side compartments 220a and 220b can be viewed while the aisle doors 235a and 235b are in the closed position. This viewing gives the passenger the ability to look inside of the side compartment 220a and 220b to see what, if anything, is stocked within.

In this exemplary embodiment, the monument 100 is shown as having four individual footwells 245a, 245b, 245c, and 245d that provide leg room comfort for four individual passengers without space reduction to the cabin. Vertical dividers 250a, 250b, and 250c separate the individual footwells 245a, 245b, 245c, and 245d from one another. By not having to share a common footwell, each passenger can use their own footwell without interfering with the footwell of an adjacent passenger. The individual footwells 245a, 245b, 245c, and 245d may also contain LED lighting (such as RGB or UV lighting) in the foot compartment that provides a passenger with added convenience and perception of space.

Although the vertical dividers 250a, 250b, and 250c are shown as being substantially planar in shape, other shapes are possible. For example, the vertical dividers 250a, 250b, and 250c may be curved instead of being planar. In one embodiment, the vertical dividers 250a, 250b, and 250c are curved such that the middle portion of the dividers has a substantially smaller width than the top and bottom portion of the dividers.

Figure 3:
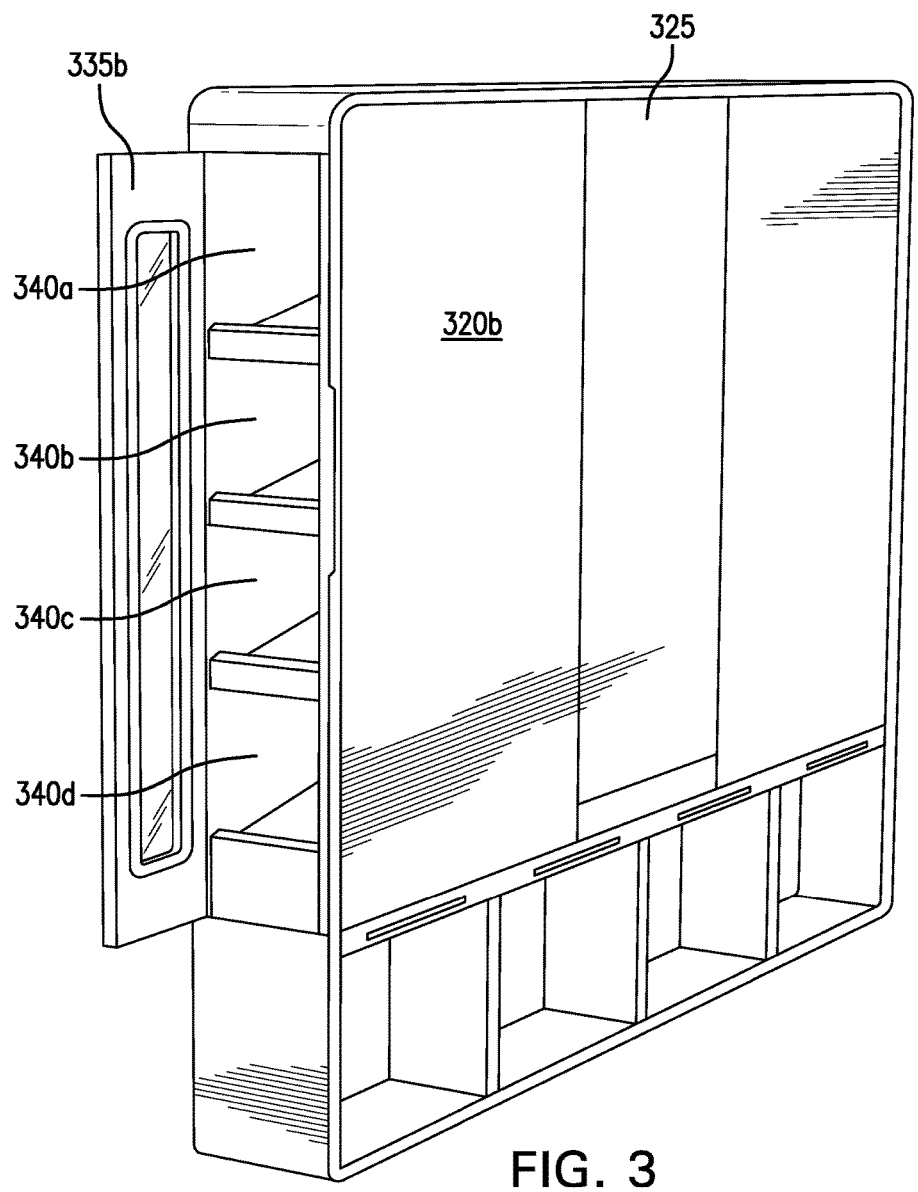
FIG. 3 depicts a perspective view of an exemplary aircraft monument with an aisle door in an open position and exposing the interior compartments of the monument.

FIG. 3 depicts a perspective view of an exemplary aircraft monument with an aisle door in an open position and exposing the interior of side compartment 320b. The aisle door 335b is shown as being in an open position, allowing a passenger to access the contents of side compartment 320b. The side compartment 320b has vertically oriented bays 340a, 340b, 340c, and 340d for retaining and/or dispensing various items. The individual bays 340a, 340b, 340c, and 340d may be heated and/or cooled separately or together via the central compartment 325. The individual bays 340a, 340b, 340c, and 340d may also provide access to different types of items. For example, bay 340a might be used to store and/or dispense hot food items, bay 340b might be used to store and/or dispense hot beverages, 340c might be used to store and/or dispense cold beverages, and 340d might be used to store and/or dispense cold food items.

Although the individual bays 340a, 340b, 340c, and 340d are shown as being vertically stacked on top of one another, other orientations are possible. For example, two or more narrower the bays might be horizontally adjacent to one another. In another example, the bays may have adjacent bays in both the horizontal and vertical directions. The individual bays 340a, 340b, 340c, and 340d may be defined by substantially flat, planar surfaces, or may have other types of surfaces. For example, the bottom surface of a bay may be curved to conform to the shape of the contents being stored within the bay. Each bay may also have dividers for separating each item being stored within the bay.

Figure 4:
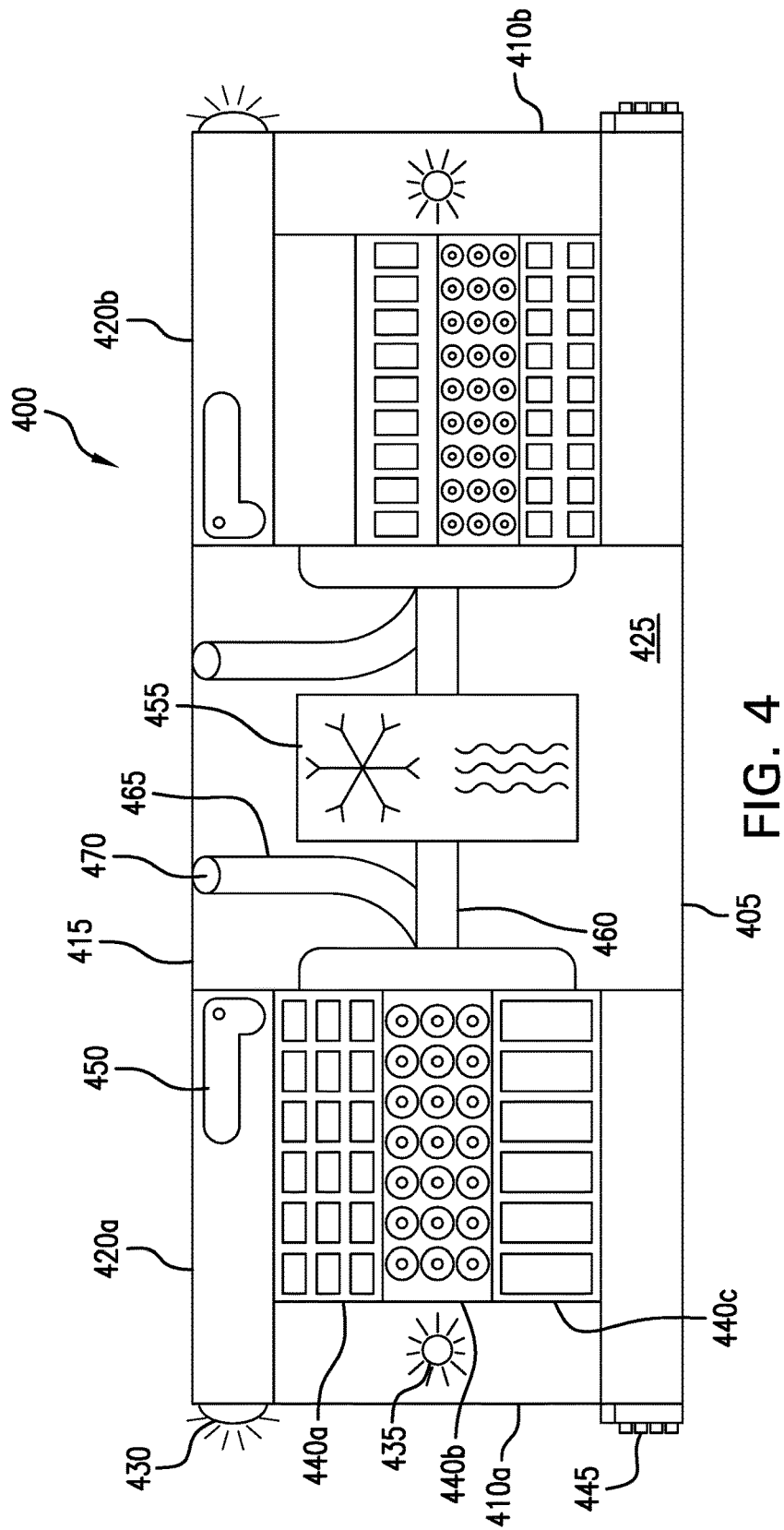
FIG. 4 depicts a section view of an exemplary aircraft monument illustrating the contents of the interior compartments of the monument.

FIG. 4 depicts a section view of an exemplary aircraft monument illustrating the contents of the interior compartments of the monument. As depicted, the outer perimeter of the monument 400 is defined by an aft-facing wall 405, two opposing aisle-facing walls 410a and 410b, and forward-facing wall 415. The monument 400 is divided up into three separate compartments (two side compartments 420a and 420b and one center compartment 425). As the side compartments 420a and 420b are essentially mirror images of each other, the features of either side compartment 420a or 420b will now be further described in detail with reference to side compartment 420a.

In an exemplary embodiment, side compartment 420a has at least two types of lighting. There is an exterior light source 430 on the outside of side compartment 420a (on the aisle-facing wall 410a) that provides lighting to the area around the aisle-facing wall 410a. This enables a passenger to see more clearly the area around the outside of the aisle-facing wall 410a. An interior light source 435 lies within the side compartment 420a, and allows a passenger accessing the side compartment 440a to see more clearly the area inside of the side compartment 440a.

Horizontal bays 440a, 440b, and 440c that lie within the side compartment 440a are configured to retain and/or dispense various items to a passenger. Although three bays are illustrated for the side compartment 440a, the number of bays can be smaller or larger depending upon, for example, the size of the items stored within the side compartment 440a and the exact dimensions of monument 400. The bays 440a, 440b, and 440c may be selectively accessible by a passenger. Food items, snacks, beverages, or any other types of items may be stored in the bays 440a, 440b, and 440c.

A passenger can utilize a vending user interface 445 to select an item inside of side compartment 440a that the passenger desires. In one embodiment, side compartment 440a may act as a vending machine that drill only dispense a selected item to a passenger when sufficient payment is made using the vending user interface 445. The vending user interface 445 may accept payment through various means (such as by credit card or cash), and user selection of the desired item may be accomplished through various means (such as a keypad or touch screen interface). Alternatively, access to the contents of the side compartment 440a may be "gratis" as part of the passenger fare.

Cooled areas within the side compartment 420a may create significant condensation on various surfaces. A passenger accessing a beverage within the side compartment 420a may also accidentally spill the beverage within the side compartment 420a as well. In order to collect spilled liquids or condensation, the side compartment 420a has a drain 450 for receiving water condensation or liquid from spilled beverages. The drain 450 may be configured within the side compartment 420a so that the force of gravity directs any liquid or condensation into the drain 450. The drain 450 may connect to a liquid waste management region of the aircraft.

The temperature of the side compartments 420a and 420b may be controlled through various mechanisms contained within the center compartment 425. In one embodiment, center compartment 425 houses a thermal unit 455 which is configured to provide hot or cold air flow to either side compartment 420a or 440b. The air flow is channeled through input ducting 460 that may be connected to the entirety of the side compartment 420a, or may be selectively attached to each of the bays 440a, 440b, and 440c. The circulated air is then channeled out of the bays 440a, 440b, and 440c (or the side compartment 440a) through output ducting 465. In the present embodiment, the output ducting 465 sends air flow through output ducting apertures 470 in the forward-facing wall 415. However, other embodiments may have the output ducting 465 configured to re-circulate the air flow back to the thermal unit 455 for recycling.

Certain contents stored within the side compartments may also require a certain level of humidity to adequately preserve them. Although not depicted in FIG. 4, the center compartment may house a humidifier which controls the humidity of the side compartments 420a and 420b. The humidifier may be connected to the side compartments 420a and 420b in a way similar to the thermal unit 455. The humidifier may have its own separate control which is independent from the control of the thermal unit 455.

Figure 5:
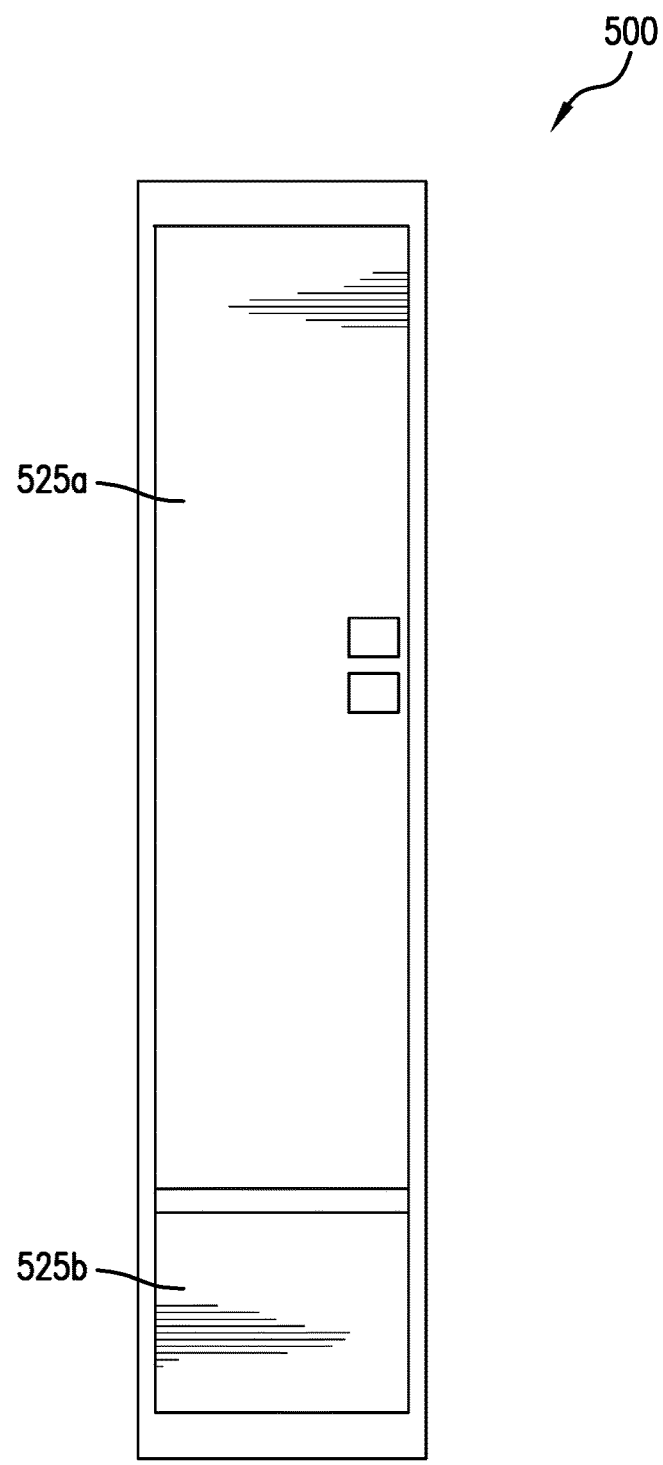
FIG. 5 depicts a side view of an exemplary aircraft monument with a footwell built into the monument.

FIG. 5 depicts a side view of an exemplary aircraft monument with a footwell built into the monument. The monument 500 is defined by an aft-facing wall (not shown), a forward-facing wall (not shown), an outboard-facing wall (not shown), a top cover (not shown), and two aisle doors 525a and 525b that are proximate to an aisle (not shown). The two aisle doors 725 a and 725b can be used to access an upper stowage closet (not shown) and lower compartment (not shown) contained within the monument 500.

Figure 6:
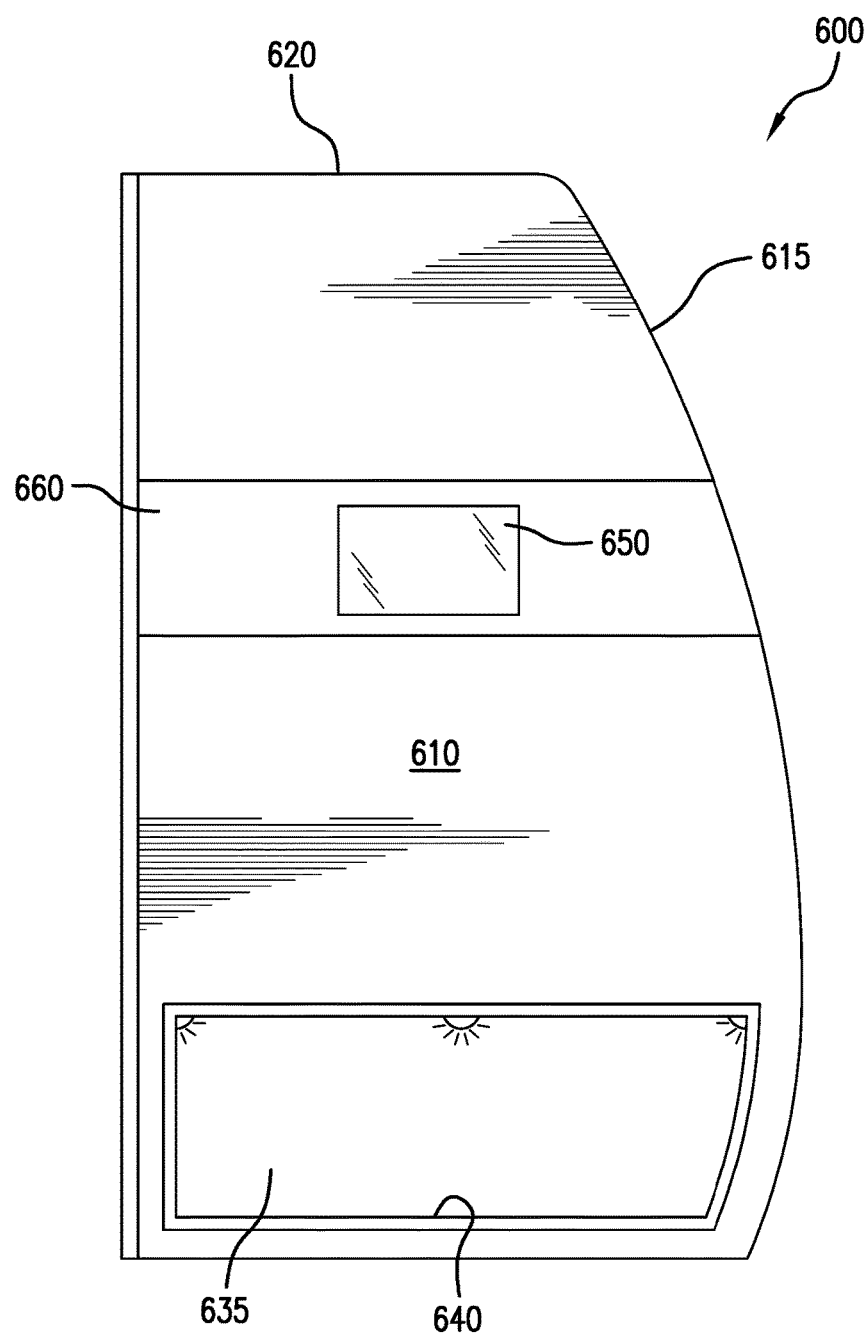
FIG. 6 depicts a front view of an exemplary aircraft monument with a footwell built into the monument.

FIG. 6 depicts a front view of an exemplary aircraft monument with a footwell built into the monument. The monument 600 as illustrated is configured to conform to the shape of an outboard wall of an airplane. The monument 600 is defined by an aft-facing wall 610, a forward-facing wall (not shown), an outboard-facing wall 615, a top cover 620, and two aisle doors (not shown) that are proximate to an aisle (not shown). The aft-facing wall 610, forward-facing wall (not shown), and outboard-facing wall 615 each possesses a unique profile that conforms to the profile of an outboard wall of an aircraft.

The monument 600 has a footwell 635 disposed in the bottom portion of the aft-facing wall 610 for receiving passengers' feet and lower legs. The footwell 635 has a ledge 640, which is slightly elevated above the floor (not shown). The exact level of elevation of the ledge 640 may be customized to conform to the height requirements of a typical passenger aboard an aircraft. A video screen 650 is shown as being attached to or embedded within the aft-facing wall 610 for the viewing pleasure of passengers. An applied graphics panel 660 is also attached to or embedded within the aft-facing wall 610.

As illustrated, FIG. 6 includes a shared footwell region 635 for passengers. In other embodiments, the footwell region 635 may be divided, such as the footwells of FIGS. 1, 2, and 3. The space in each footwell may be substantially the same as other footwells. The space in each footwell may instead have different amounts of space for each footwell.

Figure 7:
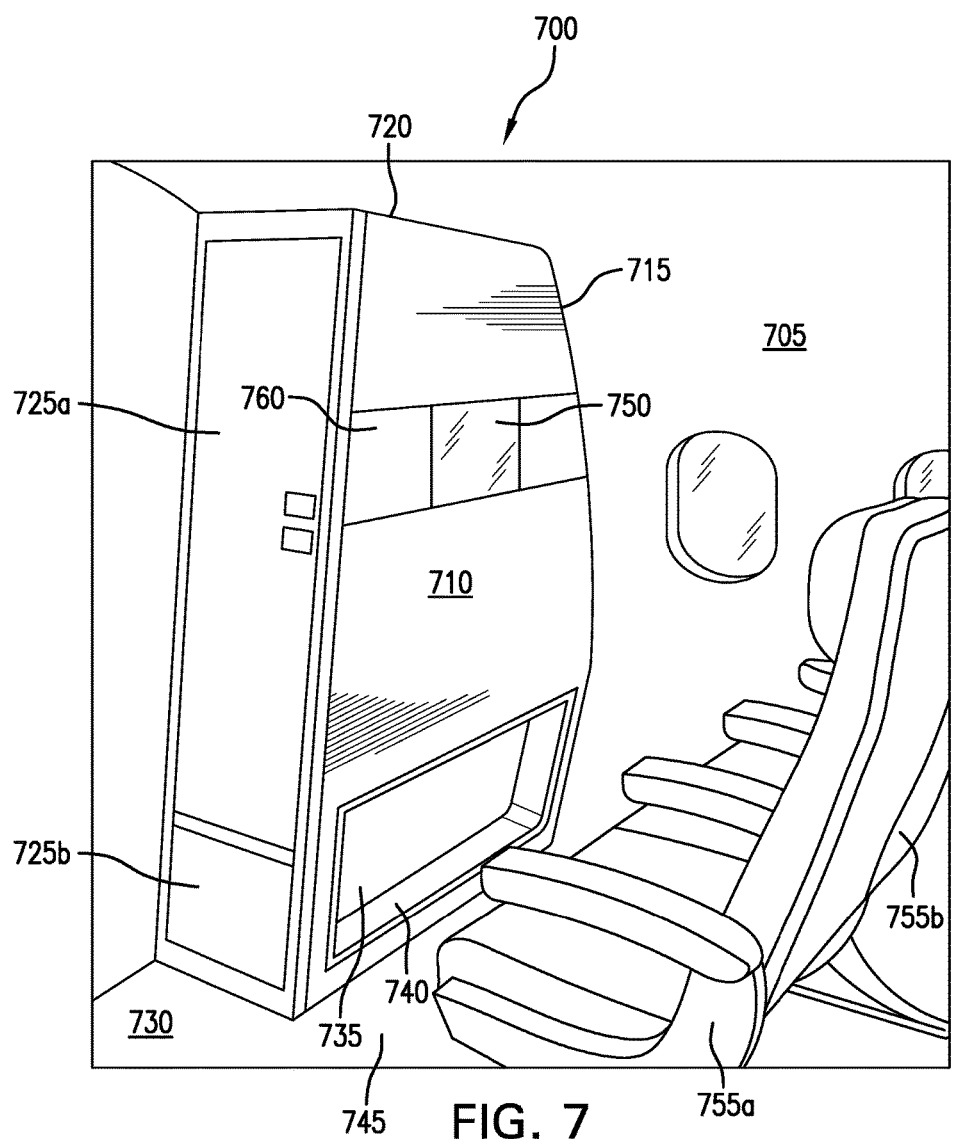
FIG. 7 depicts an exemplary aircraft monument abutting an outboard wall of an aircraft with a footwell built into the monument.

FIG. 7 depicts an exemplary aircraft monument abutting an outboard wall of an aircraft with a footwell built into the monument. The monument 700 as illustrated is configured to conform to the shape of an outboard wall 705 of an airplane. The monument 700 is defined by an aft-facing wall 710, a forward-facing wall (not shown), an outboard-facing wall 715, a top cover 720, and two aisle doors 725 a and 725b that are proximate to an aisle 730. The two aisle doors 725 a and 725b can be used to access an upper stowage closet (not shown) and lower compartment (not shown) contained within the monument 700. The aft-facing wall 710, forward-facing wall (not shown), and outboard-facing wall 715 each possesses a unique profile that conforms to the profile of the outboard wall 705 of an aircraft.

Although the monument 700 is generally shaped to occupy the cabin space defined between the floor, outboard-facing wall 715, and ceiling of an aircraft, other alternative embodiments are possible. For example, the monument 700 might have an open space between the top cover 720 of the monument 700 and the ceiling of the aircraft. There may also be intermediate objects that are spaced between the surfaces on the outside of the monument 700 and the floor, outboard-facing wall 715, and ceiling of the aircraft. For example, a separate footwell that is independent of the monument 700 may be fitted between the monument 700 and the floor of the aircraft.

The monument 700 has a footwell 735 disposed in the bottom portion of the aft-facing wall 710 for receiving passengers' feet and lower legs. The footwell 735 has a ledge 740, which is slightly elevated above the floor 745. The exact level of elevation of the ledge 740 may be customized to conform to the height requirements of a typical passenger aboard an aircraft.

The ledge 740 may be inclined in the aft or forward directions for increased comfort. Additional foot rests may be positioned on top of the ledge 740. The ledge 740 may also be padded or cushioned, or may be rigid and solidly formed.

A video screen 750 is shown as being attached to or embedded within the aft-facing wall 710 for the viewing pleasure of passengers sitting in passenger seats 755 *a* and 755 *b*. An applied graphics panel 760 is also attached to or embedded within the aft-facing wall 710. The applied graphics panel 760 may also be customized for the aesthetic pleasure of passengers sitting in passenger seats 755 *a* and 755 *b*.

In some embodiments, a lower aisle door 725*b* may be configured as a footwear storage compartment (not shown) for retaining passenger shoes or footwear. The footwear storage compartment may have various methods for sanitizing a passenger's footwear. One example of a sanitizing method may be pulsed UV light contained within the footwear storage compartment, combined with an interlock that turns off the UV light source when the lower aisle door 725*b* is opened. Another possible method for sanitizing passenger footwear may include a sanitizing pad inside of the footwear storage compartment that possess anti-bacterial properties. Further, the storage compartment 725*b* may be provided with air conditioning in the form of a scent or odor management compound which reduces or removes offensive odors from the storage compartment 725*b*.

Figure 8:
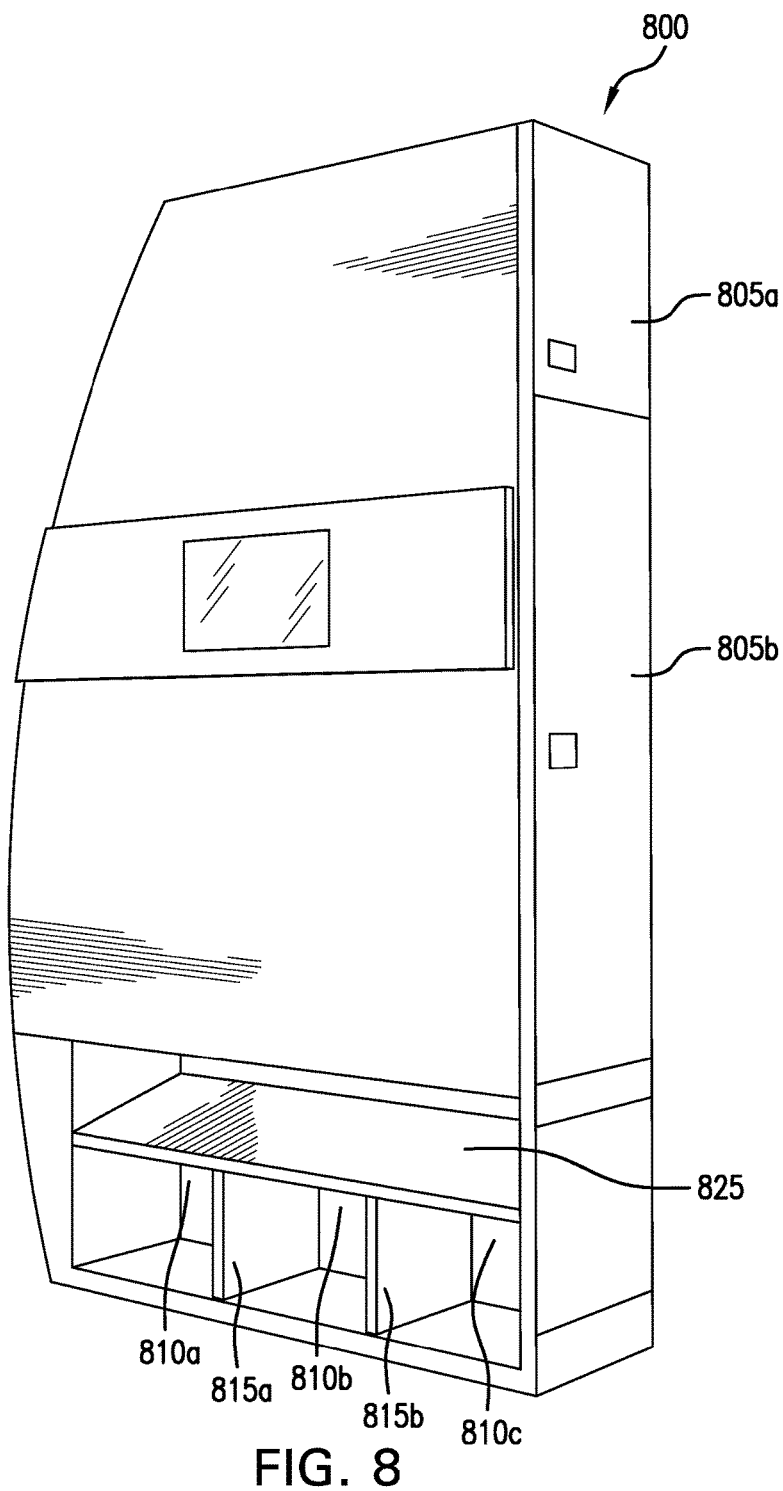
FIG. 8 depicts a perspective view of an exemplary aircraft monument with lower stowage compartments and elevated inclined foot rests.

FIG. 8 depicts a perspective view of an exemplary aircraft monument with lower stowage compartments and elevated inclined foot rests. Aisle doors 805 *a* and 805 *b* are used for accessing upper and lower stowage compartments (not shown) contained within the monument 800. In the bottom portion of monument 800 are several stowage cavities 810 *a*, 810 *b*, and 810 *c* that can be used to stow various passenger items. The stowage cavities 810 *a*, 810 *b*, and 810 *c* are separated by vertical dividers 815 *a* and 815 *b* so that each passenger has their own personal stowage cavity separate from the other passenger's stowage cavities.

Figure 9:
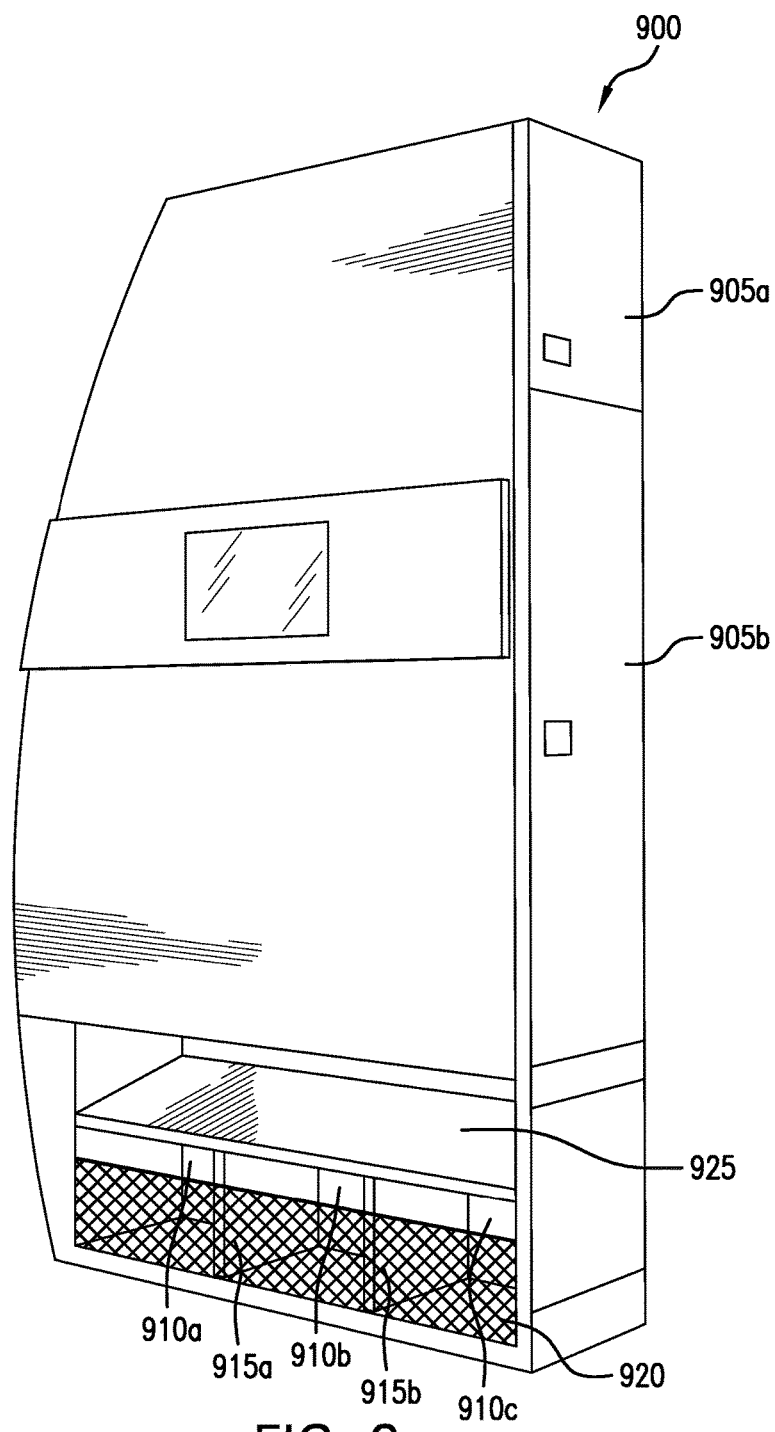
FIG. 9 depicts a perspective view of an exemplary aircraft monument with lower stowage compartments and elevated inclined foot rests.

FIG. 9 depicts a perspective view of an exemplary aircraft monument with lower stowage compartments and elevated inclined foot rests. Aisle doors 905*a* and 905*b* are used for accessing upper and lower stowage compartments (not shown) contained within the monument 900. In the bottom portion of monument 900 are several stowage cavities 910*a*, 910*b*, and 910*c* that can be used to stow various passenger items. The stowage cavities 910*a*, 910*b* and 910*c* are separated by vertical dividers 915*a* and 915*b* so that each passenger has their own personal stowage cavity separate from the other passenger's stowage cavities.

Each stowage cavity 910*a*, 910*b*, and 910*c* has its own retention element, which prevents the items being stored within the stowage cavities from falling out of or being ejected from the stowage cavity 910. One such exemplary retention element is a flexible netting 920 that is shown as mostly covering the opening to the stowage cavities 910*a*, 910*b*, and 910*c*. Any items being jostled around within any of the stowage cavities 910*a*, 910*b*, and 910*c* will be retained within the cavity by the flexible netting 920.

Other retention elements are possible for retaining various items within the stowage cavities 910*a*, 910*b*, and 910*c*. For example, the stowage cavities 910*a*, 910*b*, and 910*c* may have a pocket or pockets in which passenger items can be stowed. Another possible retaining mechanism could be a retention rail that may be movable to facilitate access to the interior of the stowage cavities 910*a*, 910*b*, and 910*c*.

A footrest 925 is disposed in the bottom portion of monument 900 and located above the stowage cavities 910*a*, 910*b*, and 910*c*. The footrest 925 is illustrated as being in a raised inclined position (although other embodiments can be horizontal or even declined). The footrest 925 may be padded or cushioned, or may be rigid and solidly formed. In one example, the footrest 925 may include individual padded regions corresponding to fore position passenger seats.

Figure 10:
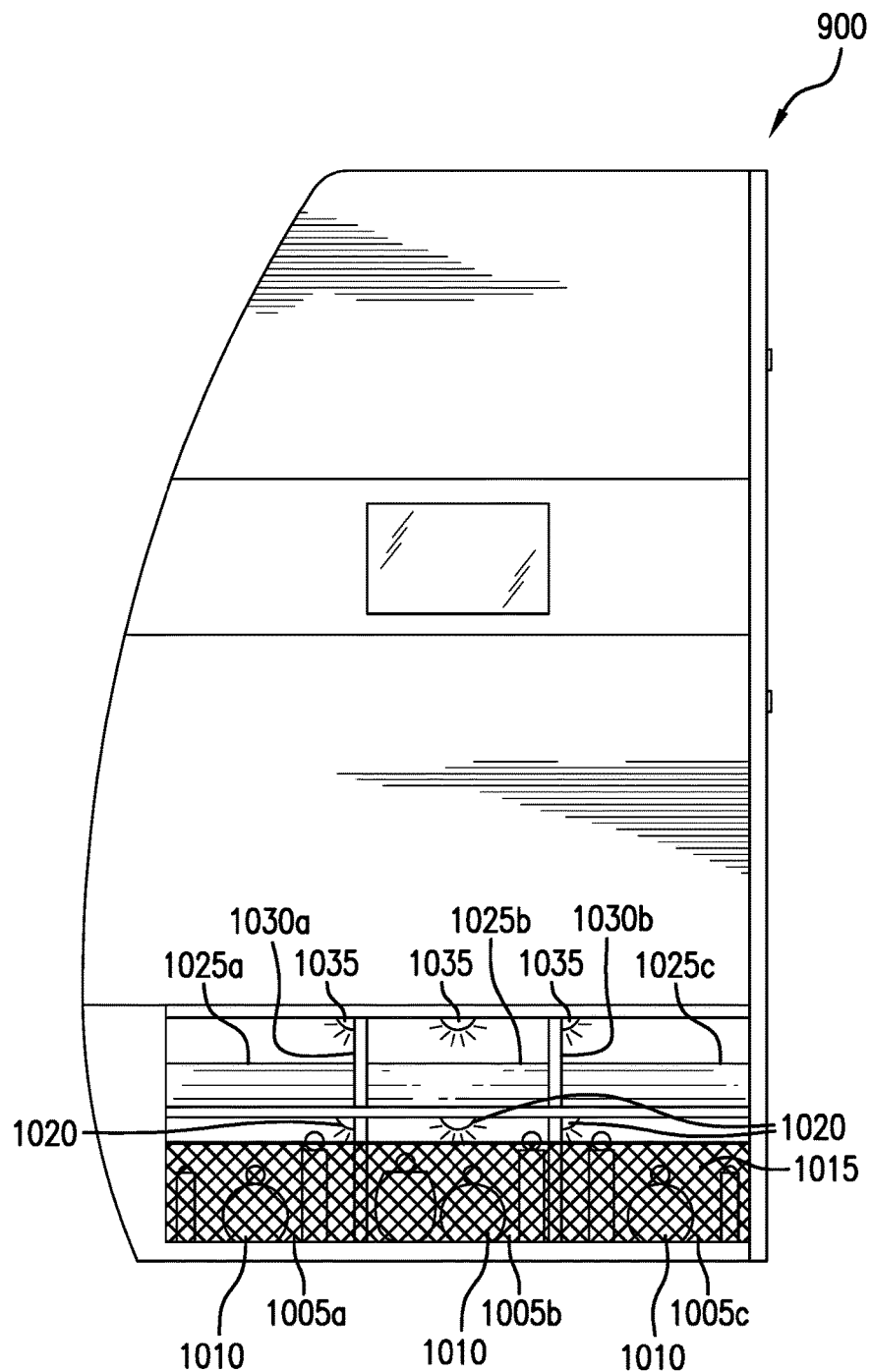
FIG. 10 depicts a front view of an exemplary aircraft monument with lower stowage compartments and elevated inclined foot rests.

FIG. 10 depicts a front view of an exemplary aircraft monument with lower stowage compartments and elevated inclined foot rests. The stowage cavities 1005*a*, 1005*b*, and 1005*c* are shown as containing multiple stowage items 1010. The stowage items 1010 are prevented from being ejected from the stowage cavities 1005*a*, 1005*b*, and 1005*c* by the flexible netting 1015. If stowage items 1010 are jostled around due to aircraft turbulence or other forces acting on the aircraft, the flexible netting 1015 provides elastic support to items that would otherwise escape from the stowage cavities 1005*a*, 1005*b*, and 1005*c*. Stowage cavity light sources 1020 provide lighting so that passengers can see the contents of the stowage cavities 1005*a*, 1005*b*, and 1005*c*.

Above the stowage cavities 1005*a*, 1005*b*, and 1005*c* are the individual footwells 1025*a*, 1025*b*, and 1025*c*, which are similar to the footwell shown in FIG. 9, but having the added feature of vertical dividers 1030*a* and 1030*b*. Footwell light sources 1035 provide lighting to each individual footwell 1025*a*, 1025*b*, and 1025*c* that provides passengers with added convenience and perception of space.

Figure 11:
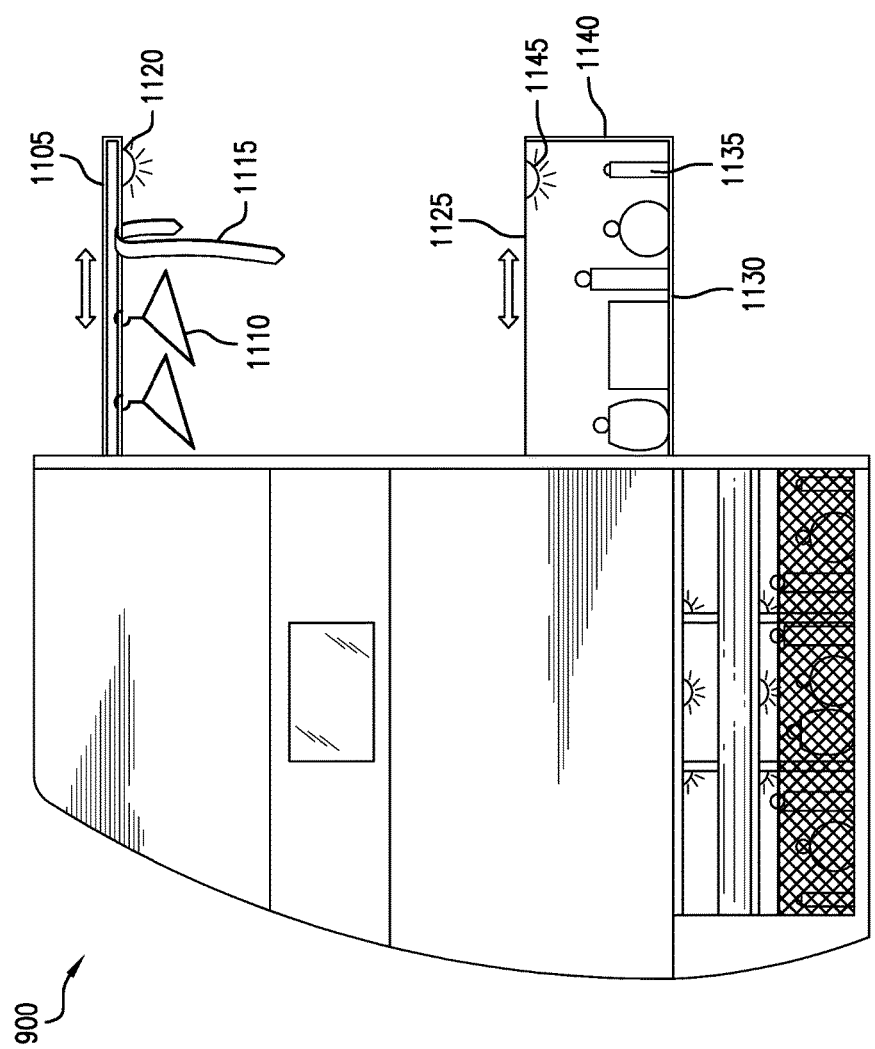
FIG. 11 depicts a front view of an exemplary aircraft monument with upper and lower stowage racks extending from the compartments of the monument.

FIG. 11 depicts a front view of an exemplary aircraft monument with upper and lower stowage racks extending from the compartments of the monument. Upper rack 1105 is able to extend and retract within the monument 900. When the upper rack 1105 is extended from the monument 900, a passenger can place various items on the upper rack 1105 for stowing within the monument 900. In the illustrative embodiment coat hangers 1110 are hanging on the upper rack 1105 along with passenger clothing 1115. When the upper rack 1105 is fully retracted within the monument 900, a door (not shown) is used to shut the upper rack 1105 inside its compartment (not shown) within the monument 900. The upper rack 1105 also has a light source 1120 attached so that passengers can see what items are stowed on the rack.

The lower rack 1125 lies below the upper rack 1105 and is also able to extend and retract within the monument 900. A bottom rack surface 1130 of the lower rack 1125 is substantially flat and supports the weight of various items placed on the bottom rack surface 1130. In the illustrative embodiment, a passenger briefcase 1135 and a variety of other items sit on the bottom rack surface 1130. The lower rack 1125 includes a wall member 1140 at its distal end that is configured to be substantially—flush with the wall on the right side of the monument 900 (not shown) when the lower rack 1125 is fully retracted within the monument 900. The lower rack 1125 also has a light source 1145 attached so that passengers can see what items are stowed on the rack.

Figure 12:
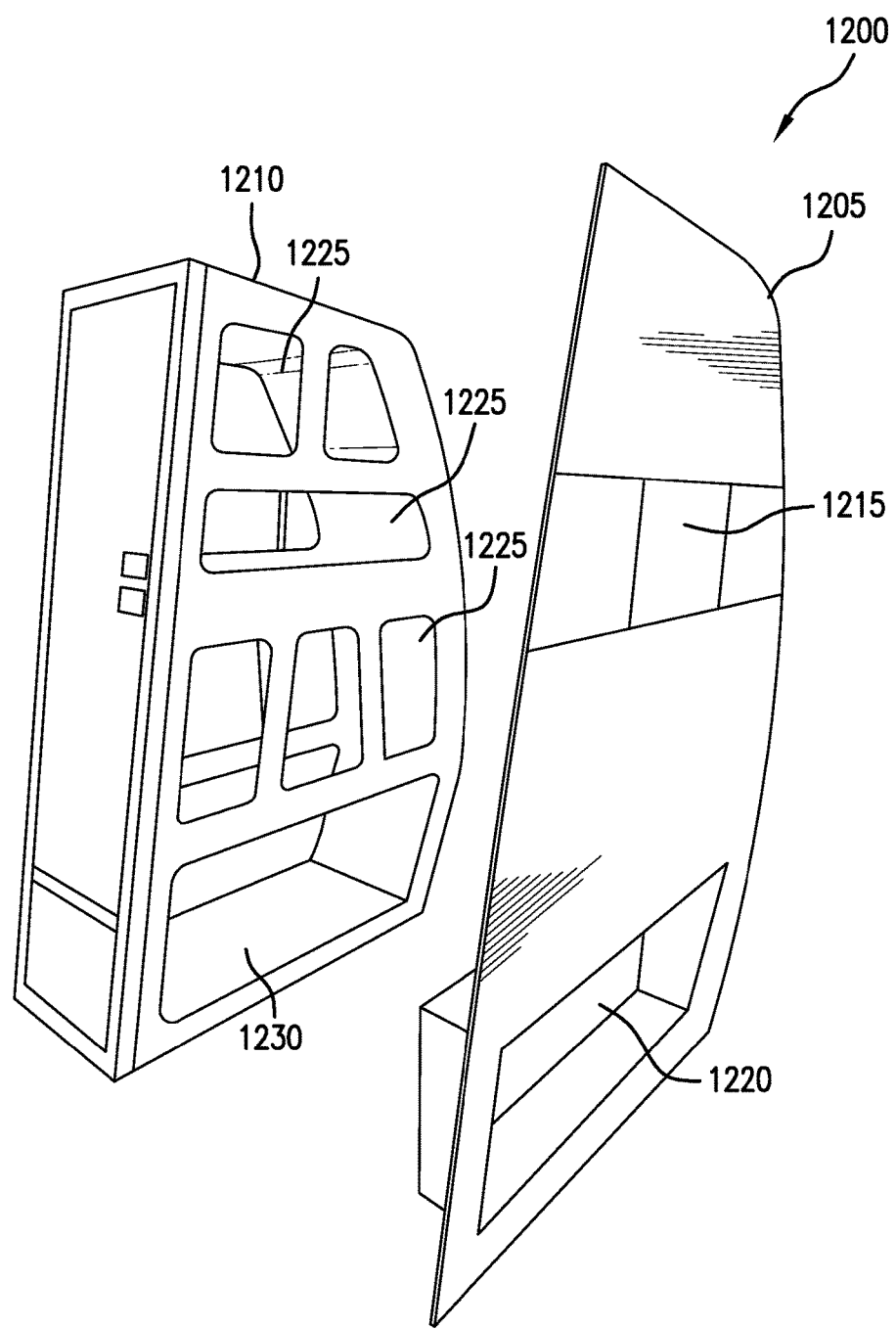
FIG. 12 depicts a perspective view of an exemplary modular aircraft monument with a detachable aft-facing façade detached from the monument.

FIG. 12 depicts a perspective view of an exemplary modular aircraft monument with a detachable aft-facing façade detached from the monument. The façade 1205 is shown as being detached from the substructure 1210, thus exposing the interior of the monument 1200. The façade 1205 has an opening 1215 configured to receive a video monitor (not shown). A footwell 1220 is also disposed within the bottom portion of the façade 1205. The façade 1205 may be used as an exterior decorative panel, and may also be configured to be replaceable (such that the façade 1205 can be replaced without having to completely replace the whole monument 1200).

The substructure 1210 has a variety of openings 1225 for weight savings and/or to receive elements attached to the façade 1205. For example, the large opening 1230 near the bottom of the substructure 1210 is sized, shaped, and positioned to allow the footwell 1220 to be received therein when the substructure 1210 and the façade are mated. Another opening through the aft side can also be used to run cabling associated with electronics on the façade 1205 (for example, a video screen). Other openings may be provided through one or more of the other sides of the monument 1200 to accommodate elements and/or save weight. The openings may come in various sizes and shapes, which can be customized to the various needs of a given aircraft.

The detachable nature of the façade 1205 facilitates a customizable close-out for the monument 1200. In this sense, the façade 1205 and substructure 1210 allow for various components of the monument 1200 to be upgraded, updated, replaced, reconfigured, refaced, or otherwise modified to suit specific needs and requirements. Thus, the monument 1200 can be changed or altered without having to entirely remove the monument 1200 and replace it with a new one.

For example, contents of the monument 1200 may be modified to present a video screen in the façade 1205. In another embodiment, the monument 1200 may be customized to house a sound system for passenger listening pleasure. In yet another embodiment, the monument 1200 can be reconfigured to store safety items that are typically found on an aircraft. Although the façade 1205 is shown as having an opening 1215 configured to receive a video monitor, the façade can have other openings or surfaces that facilitate any number of functions (such as the ones described above). The façade 1205 might also be at least partially formed out of transparent or opaque material to allow for (or prevent) viewing of the contents of monument 1200.

The façade 1205 and substructure 1210 can be attached using any number of conventional fasteners. For example, a bolt may be used to fasten the façade 1205 to the substructure 1210. Alternatively, a hook and loop fastener may be used to fasten the façade 1205 to the substructure 1210, which may better facilitate removal of the façade 1205 than a bolt fastener. In another alternative embodiment, magnets may be used to fasten the façade 1205 to the substructure 1210. The fasteners can be concealed for aesthetics and to prevent tampering.

Although various embodiments have been described with reference to the figures, other embodiments are possible. For example, the monument may be adapted to be placed in locations other than the centerline and cabin sides of an aircraft. The placing of the monument may be consistent with weight and balance considerations, ease of passenger and ground crew restocking access, and other considerations. In one possible embodiment, the monument may be configured to extend along the longitudinal axis of an airplane, with a lateral dimension that is substantially less than the monument's longitudinal dimension. Furthermore, multiple monuments may be placed at various points in an aircraft cabin, and may or may not be placed in symmetric orientations in the aircraft cabin.

In some embodiments, the monument can take forms other than a stowage closet or food/beverage compartments. For example, the monument may be formed as a partition or bulkhead to separate various sections of an aircraft. In another alternative embodiment, the monument may be formed as a galley unit located in the kitchen area of an aircraft. In yet another embodiment, the monument may be formed as a lavatory.

In some implementations, the monument may have a stowage closet that can include other options for stowing passenger items. The compartments in the monument may have coat rods for hanging passenger clothing. The coat rods may have hangers configured to support the weight of a heavy coat, or configured to hang passenger ties or belts. Monument compartments may have shelves on which passengers can place their personal items. Other types of organizers may be used, such as a hanging organizer on which passengers can hang their personal items.

In some embodiments, the monument may take forms other than a rectangular prism. For example, the outer surfaces of the monument may be curved instead of flat. The curvature of the outer surfaces may be constant or may vary along the surface. The dimensionality of the monument may be in the form of trapezoidal prism or other types of prisms.

Although some embodiments of the monument have been described as having only aft-facing features and accessories, in some embodiments, the features or accessories could instead be forward-facing. In other embodiments, the monument may have forward, aft, and side facing accessories or features. Accessories can be placed on any surface of the monument, whether that surface has a specific forward, aft, or side orientation relative to the aircraft.

In some embodiments, a sensor may be located in the footwell of the monument. In one example, a weight sensor may notify a passenger of an object is left in the footwell (for example, in case a passenger leaves something in the footwell after landing while deplaning). The weight sensor may be calibrated to send a signal to the passenger only when sufficient weight is placed on the footwell (for example, 0.5 lbs. 1 lb. or 5 lbs.). In another example, an obstruction sensor may identify existence of one or more items in the footwell of the monument, for example due to obstructing at least one beam configured to traverse a portion of the footwell. A flashing audible or visual indicator can activate to notify a passenger if an object is detected in the footwell by the sensor during deplaning mode. A deplaning mode signal may be indicated by a switch operated by the flight crew. A controller may communicate with the aircraft network to receive a mode signal, such that the sensor and indicator are put into operating mode upon receiving the signal.

In some embodiments, heating or cooling elements may be present in the footwell to increase passenger comfort. For example, a passenger may want to warm up their shoes or cool off their pillow. By placing these items in the footwell near an activated heating or cooling element, the passenger can achieve the desired temperature for their various personal items. A passenger can control whether a heating or cooling element is active using a control that may be disposed on the footwell.

In some embodiments, each side compartment may have an aft-facing door, which may be opened or closed to store, access, or dispense various items inside of side compartment. In some embodiments, side compartments may include on their aft-facing sides lock boxes, cabbies, bins, or other storage compartments. A lock box may be used for storing items that can only be accessed a key or other access means. Cubbies may be used for retaining items that do not require cooling or heating (or a particular level of humidity). Bins may be configured to extend out of the side compartment to provide for additional space to retain various items.

In some embodiments, the accessories on the monument may take various shapes or configurations. For example, cubbies may have a rounded or circular opening, and may have a raised member on the bottom of the opening so that items stored within the cubbies do not easily fall out of the cubbies. Bins may have retaining members which prevent the bins from unintentionally popping out of the monument when the airplane experiences turbulence or other jostling forces. Bins may also have handles or knobs on the outside of the bins to facilitate opening and closing of the bins.

In some embodiments, a footwell may have a dimensionality substantially resembling a rectangular prism. In some embodiments, two top vents may be located near the top of footwell, which may be used for the purpose of expelling air into the footwell. In some embodiments, a lower vent may be located on the bottom of footwell, and may be used for drawing in air from the footwell. In some embodiments, velocity and temperature of the air being expelled from top vents (and drawn into the lower vent) may be controlled using a fan speed control and a temperature control, respectively. In some embodiments, each passenger may be provided with individual temperature settings for controlling a localized air flow within their portion of the footwell. The temperature controlled air flow, in some examples, may be used to warm a pillow, blanket, or other personal item for use by the passenger.

In some embodiments, the bottom side of the footwell may have one or more inclined foot rests on which a passenger's feet can rest. In some embodiments, the foot rests may be slightly inclined to conform to the angle of a passenger's feet when positioned inside of footwell. In some embodiments, the foot rests may be spaced apart in such a manner as to conform to the spacing between a typical passenger's feet.

In some embodiments, the foot rests may be formed as a single, unitary foot rest. In some embodiments, the foot rests may be padded or cushioned. In some embodiments, the foot rests may be rigid and solidly formed. In some embodiments, the foot rests may have different angles of inclination (including zero or perhaps negative inclination). In some embodiments, the level of inclination of the foot rests may not be fixed, but rather may be set by a passenger using an inclination controller.

In some embodiments, light sources may be located on the side walls of the footwell to provide better lighting for the inside of the footwell. In some embodiments, the light sources may be located elsewhere within the footwell (such as on the back, upper, or bottom surfaces of the footwell). In some embodiments, the light sources may shine white light. In some embodiments, the light sources may be formed of RGB LEDs. In some embodiments, the light sources may shine any color or frequency of light. In some embodiments, the color of light emanating from the light sources may vary in time to provide aesthetic benefit to passengers.

In some embodiments, an exemplary aircraft monument may have aft-facing tray tables. In some embodiments, tray tables may be attached to or embedded within the aft-facing wall of the monument. In some embodiments, tray tables may be designed to fold out and provide a level surface on which a passenger can consume a meal. In some embodiments, magazine pockets or other convenience features may be incorporated into or onto the walls of the monument.

In some implementations, an aircraft monument includes at least one footwell-mounted health apparatus for the benefit of an aft-positioned passenger. In some embodiments, a footwell may have foot pedals. In some embodiments, foot pedals may be disposed within the footwell for exercising the feet or legs of a passenger. Providing foot pedals to passengers may allow for the passengers to increase the blood flow to the lower extremities during the flight. This may give the passengers the added health benefit of not being completely idle or stationary while they sit on a long (perhaps 14 hours or more) flight. In some embodiments, foot pedals may be connected to a power storage unit or an electronic device that can receive the energy expended by a user when they are pedaling on the foot pedals.

In some embodiments, the footwell may have a circulation-encouraging health apparatus such as a shiatzu foot massager or foot roller that a passenger can utilize to massage their feet. In some embodiments, a passenger may store their footwear within a footwear storage compartment contained within the monument. In a further embodiment, the monument may have step exercise equipment for encouraging passenger activity.

In some embodiments, a monument may be at least partially formed from an aircraft monument substructure. In some embodiments, the substructure may have a variety of different shapes for openings in the substructure. In some embodiments, at least one compartment in the substructure may contain ducting. In some embodiments, at least one compartment may contain various safety items (such as a life vest, life saver, and fire extinguisher). In some embodiments, at least one compartment may contain various wiring and electrical components, which may be configured to interface with electronics on the monument façade and/or lighting features in compartments. In one example, the electrical components may provide power or cable TV signals to a video screen located on the façade. In some embodiments, a receiving compartment at the bottom portion of monument may be for receiving a footwell or other feature located on the façade.

In some embodiments, the monument substructure and façade may be customized for exemplary "entertainment system" setup. In an illustrative embodiment, an entertainment setup includes a big screen monitor, a video gaining system, video game controllers, and headphones plugged into the monument. In some embodiments, the big screen monitor may face in the aft direction, thus allowing passengers sitting in forward-facing passenger seating to view the big screen monitor and interact with the monument configured to an "entertainment system" setup. In some embodiments, gaming accessories may be positioned in a footwell region. The gaming accessories, for example, may be health apparatus encouraging activity and thus increased circulation for seated passengers. For example, the footwell region may include accelerator and brake pedals for driving games, bicycle type pedals for pedaling games, or electronically friction-dampened steps mimicking walking on varying surface inclines in another exercise-related game.

In some embodiments, an aircraft monument may have forward and aft-facing accessories. For example, the accessories may be located on either the aft-facing wall or the forward-facing wall of monument.

In some embodiments, forward-facing passenger seats may be located on the aft side of monument with aft-facing video screens mounted on or integrated into the aft-facing wall, where the aft-facing video screens may be configured to align with their corresponding forward-facing passenger seat. This may give each passenger sitting in a forward-facing passenger seat control over what they are viewing on their own corresponding aft-facing video screen. In some embodiments, aft-facing passenger seats may be located on the forward side of monument. Forward-facing video screens may be mounted on or integrated into the forward-facing wall of the monument, where the forward-facing video screens may be aligned with their corresponding aft-facing passenger seat. This may give each passenger sitting in an aft-facing passenger seat control over what they are viewing on their own corresponding forward-facing video screen.

In some embodiments, footwells may be located on both the aft-facing wall and the forward-facing wall of the monument. In some embodiments, footwells may be located on any wall or surface of the monument.

In some embodiments, an aisle-facing door may restrict and/or permit access to the contents stored within the monument. In some embodiments, an aisle-facing door may be configured such that it does not interfere or impinge upon the centerline aisle, which passengers and aircraft crew may be using to travel to various points within the aircraft.

In some embodiments, a thermal unit may be located on the top of monument, which may be configured to provide heating and/or cooling to the interior contents of monument. In some embodiments, the thermal unit may be housed within the monument, provided at a bottom of the monument, or may be completely separate from the monument. In some embodiments, the thermal unit may be connected to ducting or venting in order to provide user-controllable cool and/or hot air flow to the interior compartments of monument.

In some embodiments, footwells may be climate controlled by an HVAC system located within the monument. The HVAC system may be operably connected to the footwells via ducting, which may provide both air flow delivery to, and air flow return from the footwells. In some embodiments, wiring and electrical compartments within the monument may be configured to provide electrical power and signals to video screens on the monument. In some embodiments, the wiring and electrical compartments may be connected to electrical connections external to the monument, which may provide the electrical power or signal sources for the video screens.

In some embodiments, various food and beverage compartments may containing a variety of food and beverage items (such as soda cans, prepackaged heated meals, and candy). In some embodiments, the contents of the food and beverage compartments may be selectively cooled or heated by a thermal unit via ducting. In some embodiments, the thermal unit may be on a top side of monument, may be housed within the monument, or may be completely separate from the monument.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft monument comprising:
   a monument housing defined by an aft-facing wall, a forward-facing wall, and at least one aisle-facing side wall configured to be adjacent to an aisle of an aircraft, wherein the aft-facing wall and the forward-facing wall are substantially parallel to one another;
   a plurality of compartments vertically stacked within the monument housing;
   a thermal unit housed within the monument and configured to heat or cool at least a portion of the plurality of compartments;
   at least one monument door operably attached to the monument housing and permitting access via the aisle-facing side wall to a first compartment of the plurality of compartments; and
   a footwell formed in a bottom portion of the aft-facing wall vertically below at least one of the thermal unit and the plurality of compartments, the footwell being adapted to receive feet of a passenger seated in an aft positioned passenger seat facing the aft-facing wall.

2. The monument of claim 1, wherein the monument is configured for installation abutting a bulkhead or partition wall of an aircraft.

3. The monument of claim 1, wherein the monument is configured to abut an outboard wall of the aircraft.

4. The monument of claim 1, wherein a third compartment of the plurality of compartments is a footwell.

5. The monument of claim 4, further comprising a divider wall separating the second compartment from the third compartment.

6. The monument of claim 1, further comprising at least one food or beverage item dispensing bay in the first compartment.

7. The monument of claim 1, wherein the footwell further comprises at least one air vent that directs temperature controlled air into the footwell.

8. The monument of claim 1, further comprising at least one tray table pivotably attached to the aft-facing wall and configured for actuation by the passenger in the aft positioned passenger seat.

9. The monument of claim 1, wherein the aft-facing wall is configured to be removed during a maintenance operation.

10. The monument of claim 9, wherein the monument housing is configured to permit access to the thermal unit for servicing after removal of the aft-facing wall.

11. A method of retrofitting an aircraft, comprising:
    providing a monument including a monument housing defined by an aft-facing wall, a forward-facing wall, and at least one aisle-facing side wall configured to be adjacent to an aisle of an aircraft, wherein the aft-facing wall and the forward-facing wall are substantially parallel to one another,
    a plurality of compartments vertically stacked within the monument housing,
    a thermal unit housed within the monument and configured to heat or cool at least a portion of the plurality of compartments,
    at least one monument door operably attached to the monument housing and permitting access via the aisle-facing side wall to a first compartment of the plurality of compartments, and
    a footwell formed in the bottom portion of the aft-facing wall vertically below at least one of the thermal unit and the plurality of compartments, the footwell being adapted to receive feet of a passenger seated in an aft positioned passenger seat facing the aft-facing wall; and
    securing the monument to an aft-facing bulkhead, partition, or wall of the aircraft.

12. The method of claim 11, wherein the monument is configured for installation abutting a bulkhead or partition wall of an aircraft.

13. The method of claim 11, wherein the monument is configured to abut an outboard wall of the aircraft.

14. The method of claim 11, wherein a third compartment of the plurality of compartments is a footwell.

15. The method of claim 11, wherein the monument further comprises a divider wall separating the second compartment from the third compartment.

16. The method of claim 11, wherein the monument further comprises at least one food or beverage item dispensing bay in the first compartment.

17. The method of claim 11, wherein the footwell further comprises at least one air vent that directs temperature controlled air into the footwell.

18. The method of claim 11, wherein the monument further comprises at least one tray table pivotably attached to the aft-facing wall and configured for actuation by the passenger in the aft positioned passenger seat.

19. The method of claim 11, wherein the aft-facing wall is configured to be removed during a maintenance operation.

20. The method of claim 19, wherein the monument housing is configured to permit access to the thermal unit for servicing after removal of the aft-facing wall.

* * * * *